US011537586B2

(12) United States Patent
Moon et al.

(10) Patent No.: US 11,537,586 B2
(45) Date of Patent: Dec. 27, 2022

(54) DETECTION OF LAYOUT TABLE(S) BY A SCREEN READER

(71) Applicant: Microsoft Technology Licensing, LLC, Redmond, WA (US)

(72) Inventors: Mariah Sigourney Moon, Seattle, WA (US); Ravi Gupta, Seattle, WA (US); Wesley Allan Witt, Redmond, WA (US); Carolina Hernandez, Seattle, WA (US); Matthew Walker Campbell, Bellevue, WA (US); Vanguri Madhuri, Redmond, WA (US); Cullen Ray Sauls, Redmond, WA (US); Jeffrey Allen Bishop, Kirkland, WA (US); Lindy Rose Le, Seattle, WA (US); Douglas Harold Geoffray, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 474 days.

(21) Appl. No.: 16/576,914

(22) Filed: Sep. 20, 2019

(65) Prior Publication Data
US 2020/0387494 A1    Dec. 10, 2020

Related U.S. Application Data

(60) Provisional application No. 62/858,201, filed on Jun. 6, 2019.

(51) Int. Cl.
*G06F 40/00* (2020.01)
*G06F 16/22* (2019.01)
(Continued)

(52) U.S. Cl.
CPC ........ *G06F 16/2282* (2019.01); *G06F 40/106* (2020.01); *G06V 30/412* (2022.01); *G06F 40/177* (2020.01); *G06T 2207/30176* (2013.01)

(58) Field of Classification Search
CPC .............................. G06F 40/106; G06F 40/177
See application file for complete search history.

(56) References Cited

U.S. PATENT DOCUMENTS 7,162,526 B2 * 1/2007 Dutta .................. H04L 67/2861
                                                   709/229
9,483,455 B1 * 11/2016 Bastide ............. G06F 16/24578
(Continued)

FOREIGN PATENT DOCUMENTS

EP          1536327 A2    6/2005
KR     20170038223 A    4/2017

OTHER PUBLICATIONS

WebAIM (web accessibility in mind) Creating Accessible Tables—Layout Tables, retrieved at https:/web.archive.org/web/20190524131447/https://webaim.org/techniques/tables/, 4 pages, archived May 24, 2019 (Year: 2019).*

(Continued)

*Primary Examiner* — Scott T Baderman
*Assistant Examiner* — Barbara M Level
(74) *Attorney, Agent, or Firm* — Rainier Patents, P.S.

(57) ABSTRACT

Described herein is a system and method for detecting a layout table by a screen reader. Information regarding a document being displayed by an application is received from an application programming interface of a user interface automation system that provides information regarding user interface elements of application and/or the application. The information includes an indication that the document comprises a table. A determination is made as to whether the table is a data table or a layout table based upon the received information using a rule-based heuristic. When it is determined that the table is a layout table, presentation information associated with the layout table can be skipped over, and, cell data content within the layout table provided. Thus, for a determined layout table, the system and method allow (Continued)

the screen reader to act as if the containing table doesn't exist, but still read the content.

20 Claims, 6 Drawing Sheets

(51) Int. Cl.
*G06F 40/106* (2020.01)
*G06V 30/412* (2022.01)
*G06F 40/177* (2020.01)

(56) References Cited

U.S. PATENT DOCUMENTS

| | | | |
|---|---|---|---|
| 2007/0074167 A1* | 3/2007 | Cohrs | G06F 11/3672 |
| | | | 717/124 |
| 2007/0186152 A1 | 8/2007 | Gurcan et al. | |
| 2010/0082733 A1* | 4/2010 | Bernstein | H04L 12/6418 |
| | | | 709/203 |
| 2013/0104029 A1* | 4/2013 | Hendry | G06F 40/166 |
| | | | 715/234 |
| 2013/0332815 A1* | 12/2013 | Gallo | G06F 3/011 |
| | | | 715/234 |
| 2016/0104077 A1 | 4/2016 | Jackson et al. | |
| 2018/0189560 A1* | 7/2018 | Chen | G06V 30/416 |
| 2019/0354262 A1* | 11/2019 | Bradley | G06F 3/167 |
| 2020/0153771 A1* | 5/2020 | Thies | H04L 51/18 |

OTHER PUBLICATIONS

"HTML Tables with JAWS and MAGic", Retrieved form: https://web.archive.org/web/20190128185030/https://support.freedomscientific.com/Training/Surfs-Up/Tables.htm, Jan. 28, 2019, 8 Pages.

Jacobs, et al., "Windows Information Protection (WIP)", Retrieved from: http://aka.ms/wip-dev-guide, Aug. 2, 2017, 5 Pages.

"International Search Report and the Written Opinion Issued in PCT Application No. PCT/US2020/029042", dated Jul. 31, 2020, 13 Pages.

\* cited by examiner

| FAMILY RELATIONSHIP | NAME | AGE |
|---|---|---|
| FATHER | JEFF | 52 |
| MOTHER | KERI | 48 |
| DAUGHTER | KRISTIN | 21 |
| SON | DAVID | 25 |

FIG. 3

DETECTION OF LAYOUT TABLE(S) BY A SCREEN READER

RELATED APPLICATION(S)

This application claims priority to U.S. Provisional Application No. 62/858,201, filed Jun. 6, 2019, entitled "Detection of Layout Table(s) by a Screen Reader", the disclosure of which is hereby incorporated by reference herein in its entirety.

BACKGROUND

Screen reader(s) can verbally provide information regarding object(s) (e.g., content) displayed to a user. The information provided can assist visually impaired user(s) to understand and/or navigate displayed content. For example, the screen reader can read text to the user and/or verbally provide information regarding control(s) and/or other object(s) that are being displayed. User(s) can interact with the screen reader, for example, using pre-defined key(s) of a keyboard and/or via other user input device(s).

SUMMARY

Described herein is a system for detecting a layout table, comprising: a processing system comprising a processor and a memory having computer-executable instructions stored thereupon which, when executed by the processor, cause the processing system to: receive information regarding a document being displayed by an application, the information indicating that the document comprises a table; determine whether the table is a data table or a layout table based, at least in part, upon the received information using a rule-based heuristic; and when it is determined that the table is a layout table, skip over presentation information associated with the layout table, and, start to provide cell data content within the layout table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 3 that illustrates an exemplary user interface having a data table.

DETAILED DESCRIPTION

Figure 1:
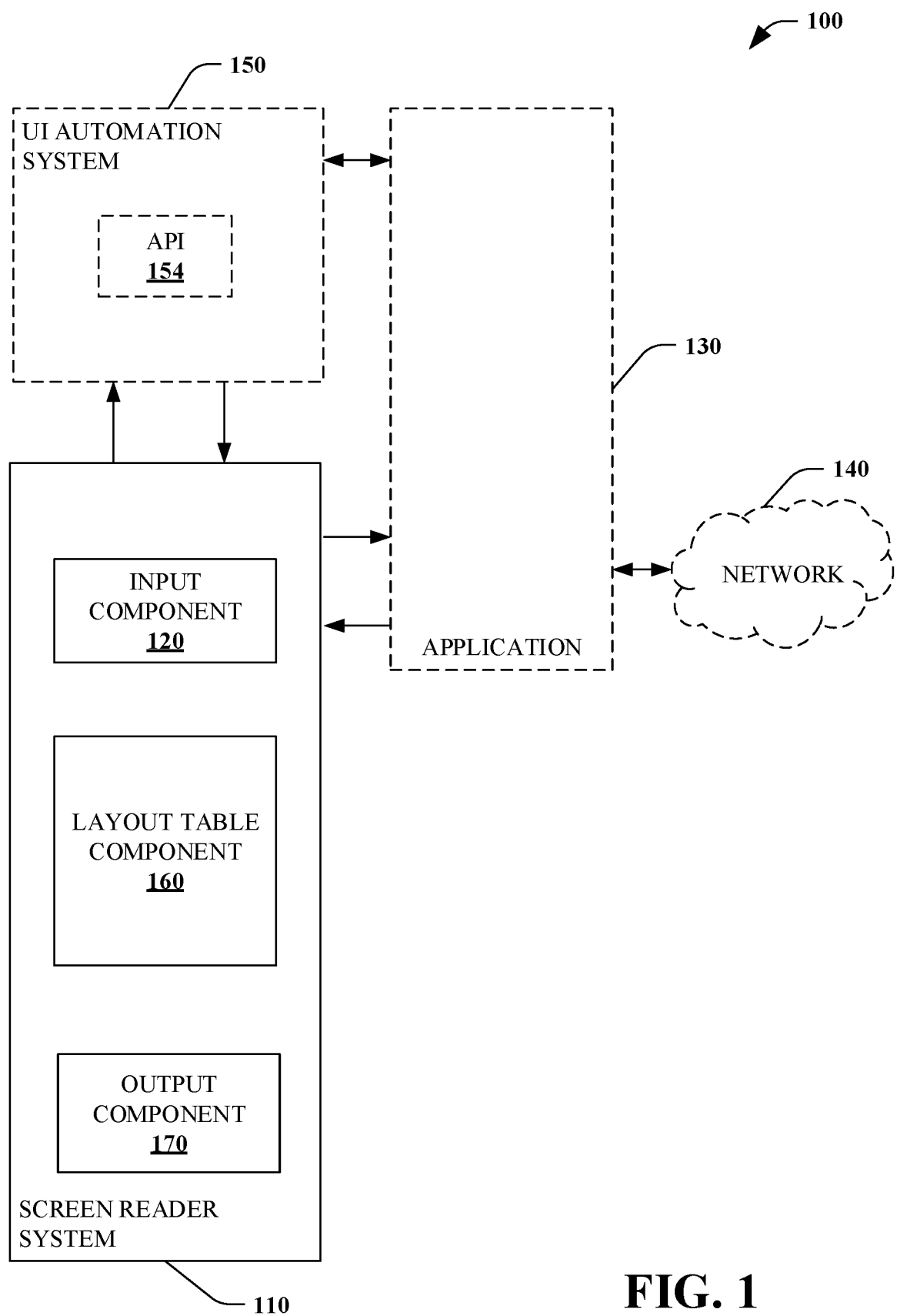
FIG. 1 is a functional block diagram that illustrates a system for detecting layout table(s).

Various technologies pertaining to detection of layout table(s) within content (e.g., web page(s) and/or email message(s)) by a screen reader are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding detection of layout table(s) within a document (e.g., web page(s) and/or email message(s)) by a screen reader. What follows are one or more exemplary systems and methods.

Aspects of the subject disclosure pertain to the technical problem of detecting of layout table(s) within a document (e.g., web page(s) and/or email message(s)) by a screen reader. The technical features associated with addressing this problem involve receiving information regarding a document being displayed by an application, the information indicating that the document comprises a table; determining whether the table is a data table or a layout table based, at least in part, upon the received information using a rule-based heuristic; and when it is determined that the table is a layout table, skipping over presentation information associated with the layout table, and, starting to provide cell data content within the layout table. Accordingly, aspects of these technical features exhibit technical effects of more efficiently and effectively providing detecting layout table(s) within content (e.g., web page or email message) in order to prevent reading of table presentation information associated with the layout table, and, start reading cell data, for example, reducing consumption of computer resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

As used herein, a "table" can be used to described information presented in a tabular manner. "Data table(s)"

and "layout table(s)" are examples of tables. For purposes of explanation, the following terms will be used to describe the text that is read by a screen reader as it relates to tables

TABLE 1

| Term | Definition |
| --- | --- |
| Cell Data | The actual data that is contained in the cell of a table |
| Cell Metadata | The coordinates for a cell that is being read and the state of the cell (n of m, merged) |
| Header Data | The actual data that is contained in a row/column that represents the header of the table |
| Header Metadata | The type of header that the cell represents (row header, column header) |

Data tables are those which have logical relationship among different cells. Layout tables are used for presentation purposes, for instance, to position different elements in the document. No relationship exists among the cells.

Many web pages and email messages use layout tables to present content. A "layout table" refers to formatting of content in a visually aesthetically pleasing manner. While the content (e.g., cell data) is structured in a table format (e.g., row(s), column(s)), a viewer of the content does not generally comprehend the cell data as a traditional data table that organizes data in row(s) and column(s).

Screen reader user(s) can experience significant cognitive load while reading email messages and other content where layout table(s) are utilized for creating a visually appealing experience to sighted users. The added cognitive load comes from having to hear table metadata which in the case of layout table(s) is irrelevant to the content being displayed.

Described herein is a system and method for detecting layout table(s) by a screen reader. The screen reader can receive information regarding a document being displayed by an application (e.g., web browser and/or email application). The received information indicate that the document comprises a table (e.g., either a data table or a layout table). The screen reader can determine whether the table is a data table or a layout table based, at least in part, upon the received information. The screen reader can employ a heuristic in making the determination.

The system and method thus differentiate between layout table(s) and data table(s), preventing the screen reader from announcing (e.g., reading) table-related information for layout table(s). For example, when the screen reader determines that the table is a layout table, presentation information associated with the layout table can be removed (e.g., skipped over) in order for the screen reader to start reading content of cell(s) (e.g., the actual data that is contained in the cell of the layout table such as substantive content of web page and/or email message) within the layout table. In this manner, a user can enjoy a screen reading session in which presentation of table information of layout table(s) of document(s) (e.g., of web page(s) and/or email message(s)) is eliminated, thus allowing the user to focus on the content of the document(s). Thus, if the table is determined to be a layout table, the system and method allow the screen reader to act as if the containing table doesn't exist, but still read the content. For example, this can mean that the table navigation command(s) such as t, row, column nav, etc. will be removed (e.g., not read), and/or there will be no reading of cell metadata such as "N of M".

Referring to FIG. 1, a system for detecting layout table(s) 100 is illustrated. The system 100 includes a screen reader system 110 comprising an input component 120 that receives user input for interaction with the screen reader system 110. For example, the received input can comprise a keyboard command comprising one or more keys.

In some embodiments, a user requests an application 130 (e.g., a web browser and/or an email application) to load a particular document. In some embodiments, the user can request to navigate to a particular web site and load an associated document (e.g., HTML web page). In some embodiments, the user can request to open a particular email message using the application (e.g., email application).

The application 130 can obtain the document, for example, a web page from a network 140 (e.g., the Internet) and load the document (e.g., web page and/or email message). The application 130 can further place a user interface (UI) focus on the document (e.g., display the web page and/or email message).

The application 130 can display the document to the user and, optionally, provide information regarding the document (e.g., web page and/or email message) to the screen reader system 110. The application 130 can further provide information regarding the document to a user interface automation system 150 that allows the screen reader component 110 (e.g., and other component(s)) to have access to, identification of, and/or manipulation of user interface (UI) element(s) of the application 130 (e.g., web browser and/or email application), for example, through an application programming interface 154 (e.g., Microsoft® UI Automation API). Thus, in some embodiments, the screen reader system 100 can receive information regarding the document using the API 154 of the UI automation system 150.

In some embodiments, the document (e.g., web page and/or email message) is displayed to the user by the application 130, information provided to the screen reader system 110, and, information provided to the user interface automation system 150 substantially in parallel. In some embodiments, information is provided to the screen reader system 110 and/or the user interface automation system 150 before the document is displayed to the user by the application 130.

Figure 2:
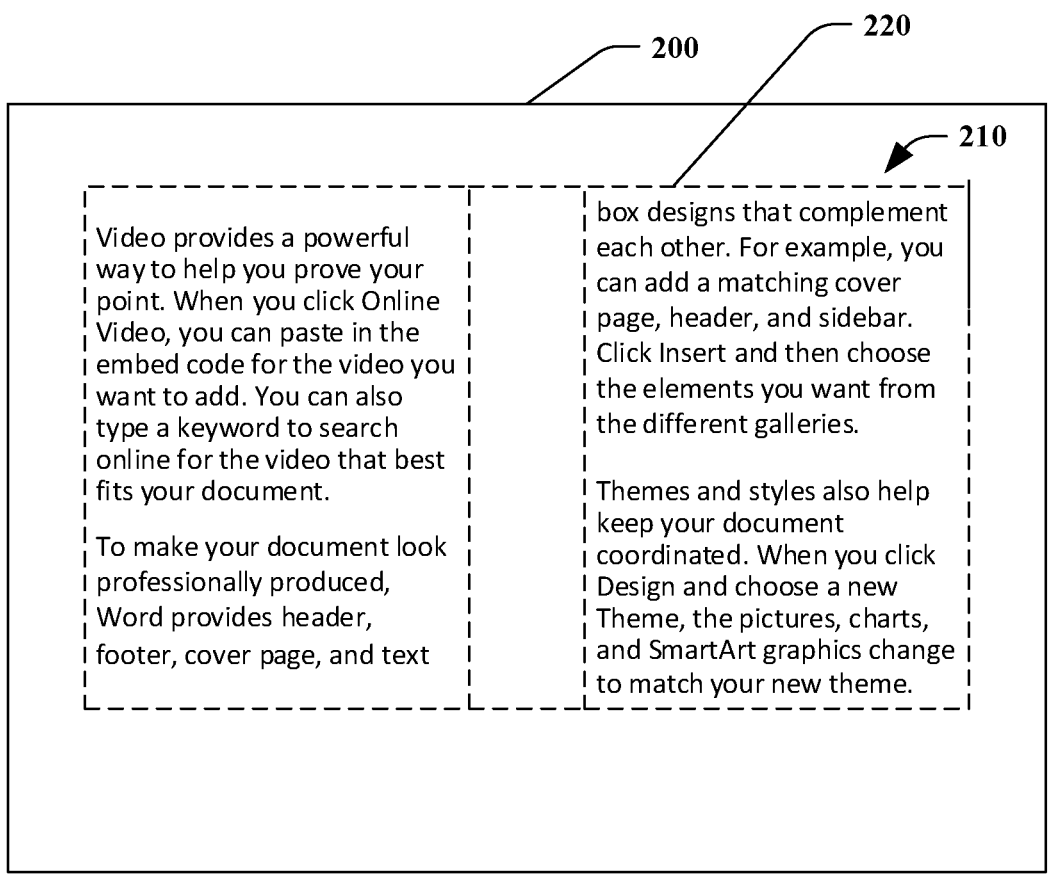
FIG. 2 that illustrates an exemplary user interface having a layout table.

The information received regarding the document (e.g., from API 154) can include an indication that the document comprises a table. Turning briefly to FIG. 2, an exemplary user interface 200 including a layout table 210 is illustrated. The layout table 210 is illustrated with a grid 220 for purposes of explanation only. In some embodiments, the grid 220 would not be visible to a user of the application 130. In some embodiments, the grid 220 is visible to a user of the application 130.

Figure 3:
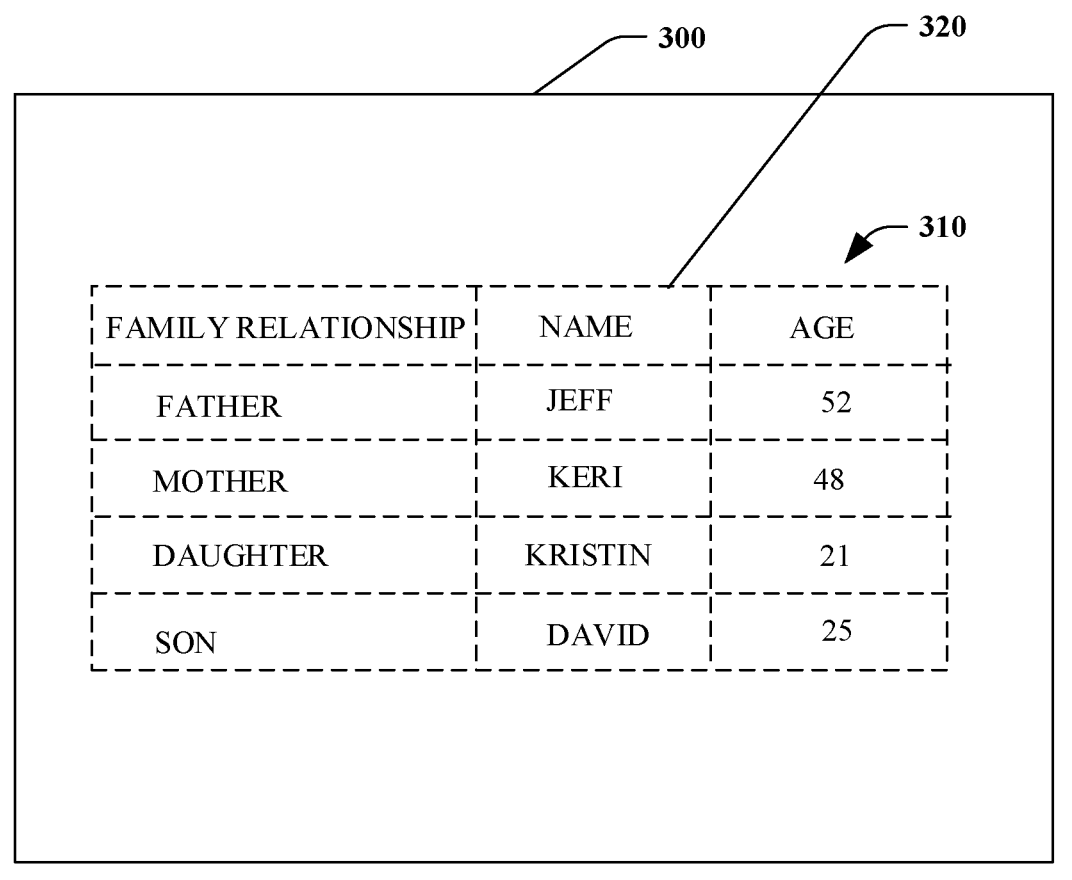

Referring briefly to FIG. 3, an exemplary user interface 300 including a data table 310 is illustrated. The data table 310 is illustrated with a grid 320 for explanation purposes. In some embodiments, the grid 320 is visible to a user of the application 130. In some embodiments the grid 320 is not visible to a user of the application 130.

Referring back to FIG. 1, the screen reader system 110 further includes a layout table component 160 that receives information regarding the document being displayed by the application 130. The information can indicate that the document comprises a table. The screen reader system 100 can determine whether the table is a data table or a layout table based, at least in part, upon the received information. When it is determined that the table is a layout table, the screen reader system 110 can skip over presentation information associated with the layout table and start to reading cell data (e.g., substantive content of web page and/or email message) within the layout table.

In some embodiments, the layout table component 160 applies a rule-based heuristic to the information regarding UI element(s) received from the UI automation system 150 (e.g., property(ies) and/or attribute(s)). In some embodiments, the rule-based heuristic utilizes only the information regarding UI element(s) and does not utilize content of the received document.

The rule-based heuristic can utilize a defined set of attribute(s) that define data tables and a set of attribute(s) that define layout tables (e.g., a different set) as applied to the information regarding UI element(s) received from the UI automation system 150. The heuristic can assign a weight to each attribute, and calculate a table score for both sets of attributes for a given table.

In some embodiments, when one calculated score of the set of weighted attributes exceeds the other by a predefined threshold quantity, then the table can be classified as either a data table or a layout table, accordingly. In some embodiments, when a calculated score of weighted data table attributes is greater than a predefined data table threshold, the table is classified as a data table without some or all of the calculations for a layout table score. In some embodiments, when a calculated score of weighted layout table attributes is greater than a predefined layout table threshold, the table is classified as a layout table some or all of the calculations for a data table score.

In some embodiments, the heuristic will default to classifying table(s) as data table(s), unless the calculated score for layout tables meets a predefined threshold. For purposes of explanation and not limitation, exemplary attributes and associated weights are set forth in Table 2:

TABLE 2

| Category | Attribute | Weight |
|---|---|---|
| Data Table | Table name | Large |
| Data Table | Contains row or column headers | Small |
| Data Table | Cells are editable | Large |
| Data Table | Caption | Extra Large |
| Data Table | Spreadsheet or spreadsheet item | Extra Large |
| Data Table | Visual Borders | Medium |
| Layout Table | No Visual Borders | Medium |
| Layout Table | No row or column headers | Small |
| Layout Table | Empty row or column header cells | Medium |
| Layout Table | Single row | Large |
| Layout Table | Single column | Large |
| Layout Table | Empty cells | Medium |
| Layout Table | Cells with no textual content | Medium |
| Layout Table | Cells with non-textual objects | Medium |
| Layout Table | Meaningless or missing name | Small |
| Layout Table | No bounding rectangle on table | Large |
| Layout Table | No bounding rectangle on cells | Large |
| Layout Table | Nested tables | Small |

In some embodiments, a "read only" property is tested for at least some of the cell(s). If the cell(s) are editable (e.g., not read only), the table is determined to be a data table. Otherwise the table is determined to be a layout table.

In some embodiments, when the layout table component 160 has applied the rule-based heuristic to the information regarding UI element(s) received from the UI automation system 150 and determined that a particular table is a layout table, the screen reader 110 can prevent the cell metadata and/or the header metadata information from being read by the screen reader 110 (e.g., skipping over the cell metadata and/or the header metadata information) and instead begin reading only the cell data. For example, this can be done in a continuous reading mode, screen reader reading commands mode, and/or screen reader reading navigation commands mode. In some embodiments, the screen reader 110 can read the contents of the layout table across and down.

The screen reader system 110 further includes an output component 170 that provides (e.g., reads) the cell data starting at the cell data, skipping over the presentation information associated with the layout table.

In some embodiments, one or more of the weights applied by the rule-based heuristic can be modified (e.g., adapted) based upon user action(s) and/or feedback regarding the determination of whether a particular table is a data table or a layout table.

Figure 4:
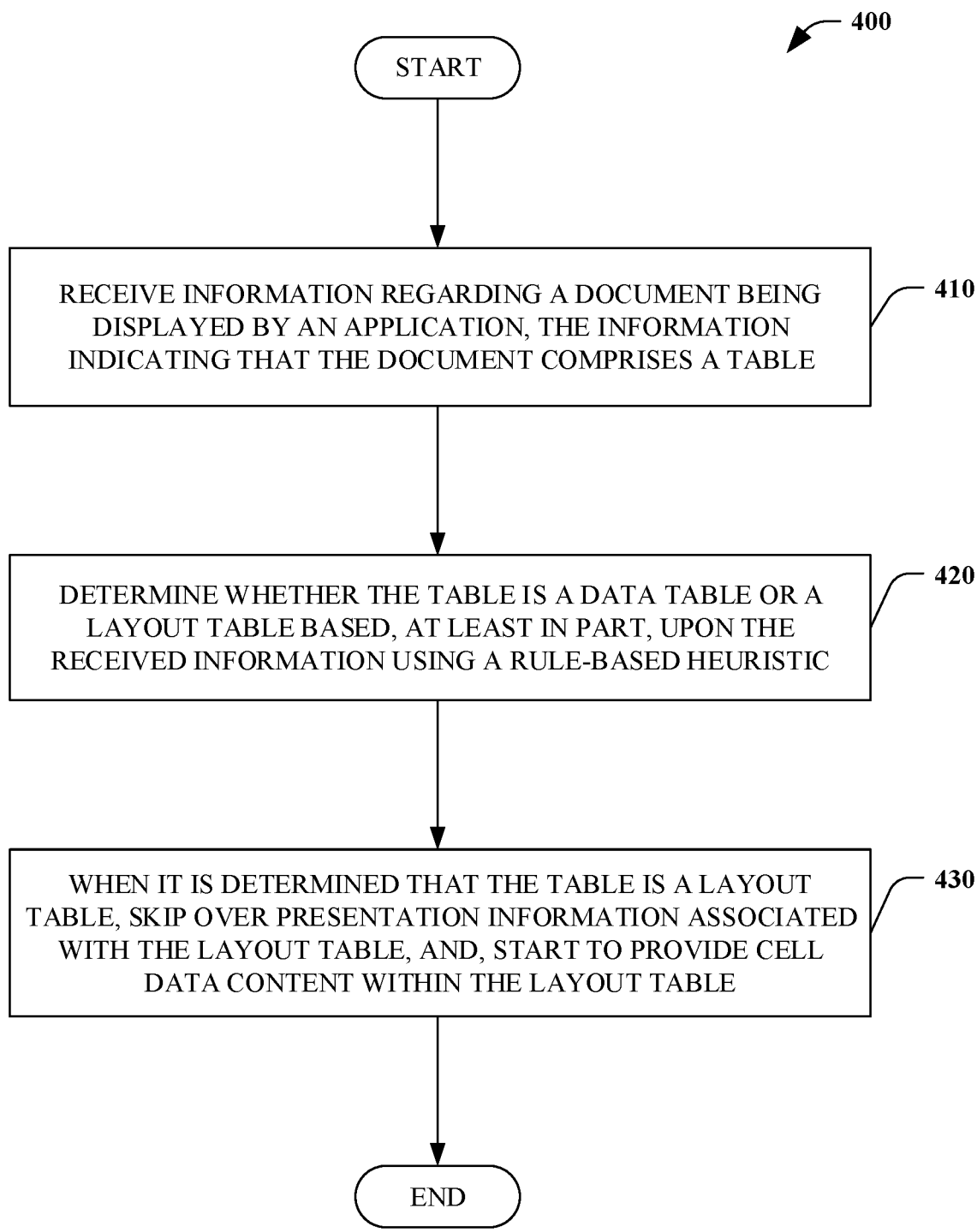
FIG. 4 is a flow chart that illustrates a method of detecting of layout table(s) within a document.
Figure 5:
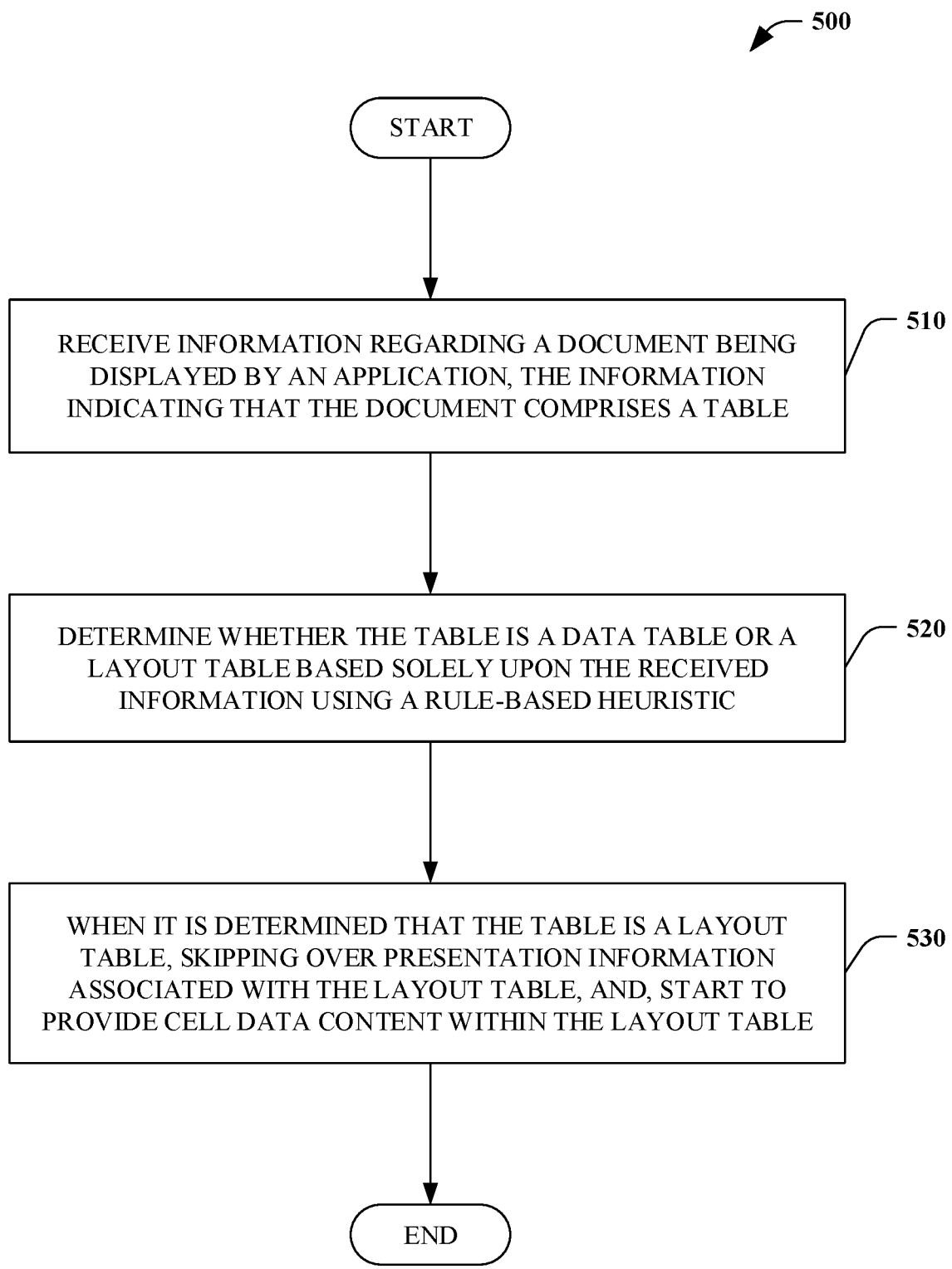
FIG. 5 is a flow chart that illustrates a method of detecting of layout table(s) within a document.

FIGS. 4 and 5 illustrate exemplary methodologies relating to detecting of layout table(s) within content (e.g., web page(s) and/or email message(s)) by a screen reader. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring to FIG. 4, a method of detecting of layout table(s) within a document (e.g., web page(s) and/or email message(s)) by a screen reader 400 is illustrated. In some embodiments, the method 400 is performed by the system 100.

At 410, information regarding a document being displayed by an application is received. The information comprises an indication that the document comprises a table.

At 420, a determination is made as to whether the table is a data table or a layout table based, at least in part, upon the received information using a rule-based heuristic. At 420, when it is determined that the table is a layout table, presentation information associated with the layout table is skipped over, and, cell data content within the layout table is provided (e.g., read).

Turning to FIG. 5, a method of detecting of layout table(s) within a document (e.g., web page(s) and/or email message(s)) by a screen reader 500 is illustrated. In some embodiments, the method 500 is performed by the system 100.

At 510, information regarding a document being displayed by an application is received (e.g., from an API 154 of a UI automation system 150). The information comprises an indication that the document comprises a table.

At 520, a determination is made as to whether the table is a data table or a layout table based solely upon the received information (e.g., from an API 154 of a UI automation system 150) using a rule-based heuristic. That is, the determination is not made based on content of the document received the application. Instead, the determination is made based only upon information obtained from an API associated with a user automation system (e.g., API 154 of a user automation system 150).

At 530, when it is determined that the table is a layout table, presentation information associated with the layout table is skipped over, and, cell data content within the layout table is provided (e.g., read).

Described herein is a system for detecting a layout table, comprising: a processing system comprising a processor and a memory having computer-executable instructions stored thereupon which, when executed by the processor, cause the processing system to: receive information regarding a document being displayed by an application, the information indicating that the document comprises a table; determine whether the table is a data table or a layout table based, at least in part, upon the received information using a rule-based heuristic; and when it is determined that the table is a layout table, skip over presentation information associated with the layout table, and, start to provide cell data content within the layout table.

The system can further include wherein the information regarding user interface elements associated with the document is received from an application programming interface of a user interface automation system that provides access to user interface elements of the application. The system can further include wherein the determination whether the table is a data table or a layout table is based upon a calculated table score. The system can further include wherein the calculated table score is based, at least in part, upon attribute information received from the application programming interface, the attribute information comprising at least one of a table name, a row header, a column header, an editable cell, a caption, a visual border, or a spreadsheet pattern.

The system can further include wherein the calculated table score is based, at least in part, upon attribute information received from the application programming interface, the attribute information comprising at least one of a row header, a column header, a number of rows, a number of columns, cell information, bounding rectangle on table information, bounding rectangle on cells information, or nested table information. The system can further include wherein the presentation information comprises at least one of table navigation commands, table metadata, or cell metadata.

The system can further include wherein the rule-based heuristic utilizes only information regarding user interface elements and does not utilize content of the document. The system can further include wherein the rule-based heuristic is modified based upon at least one of a user action taken in response to the determination of whether the particular table is a data table or a layout table, or user feedback regarding the determination of whether the particular table is a data table or a layout table.

Described herein is a method of detecting a layout table, comprising: receive information regarding a document being displayed by an application, the information indicating that the document comprises a table; determine whether the table is a data table or a layout table based solely upon the received information using a rule-based heuristic; and when it is determined that the table is a layout table, skipping over presentation information associated with the layout table, and, starting to provide cell data content within the layout table.

The method can further include wherein the information regarding user interface elements associated with the document is received from an application programming interface of a user interface automation system that provides access to user interface elements of the application. The method can further include wherein the determination whether the table is a data table or a layout table is based upon a calculated table score. The method can further include wherein the calculated table score is based, at least in part, upon attribute information received from the application programming interface, the attribute information comprising at least one of a table name, a row header, a column header, an editable cell, caption, a visual border, or a spreadsheet pattern. The method can further include wherein the calculated table score is based, at least in part, upon attribute information received from the application programming interface, the attribute information comprising at least one of a row header, a column header, a number of rows, a number of columns, cell information, bounding rectangle on table information, bounding rectangle on cells information, or nested table information. The method can further include wherein the presentation information comprises at least one of table navigation commands, table metadata, or cell metadata.

Described herein is a computer storage media storing computer-readable instructions that when executed cause a computing device to: receive information regarding a document being displayed by an application, the information indicating that the document comprises a table; determine whether the table is a data table or a layout table based, at least in part, upon the received information using a rule-based heuristic; and when it is determined that the table is a layout table, skip over presentation information associated with the layout table, and, start to provide cell data content within the layout table.

The computer storage media can further include wherein the information regarding user interface elements associated with the document is received from an application programming interface of a user interface automation system that provides access to user interface elements of the application. The computer storage media can further include wherein the determination whether the table is a data table or a layout table is based upon a calculated table score. The computer storage media can further include wherein the calculated table score is based, at least in part, upon attribute information received from the application programming interface, the attribute information comprising at least one of a table name, a row header, a column header, an editable cell, a caption, a visual border, or a spreadsheet pattern.

The computer storage media can further include wherein the calculated table score is based, at least in part, upon attribute information received from the application programming interface, the attribute information comprising at least one of a row header, a column header, a number of rows, a number of columns, cell information, bounding rectangle on table information, bounding rectangle on cells information, or nested table information. The computer storage media can further include wherein the presentation information comprises at least one of table navigation commands, table metadata, or cell metadata.

Figure 6:
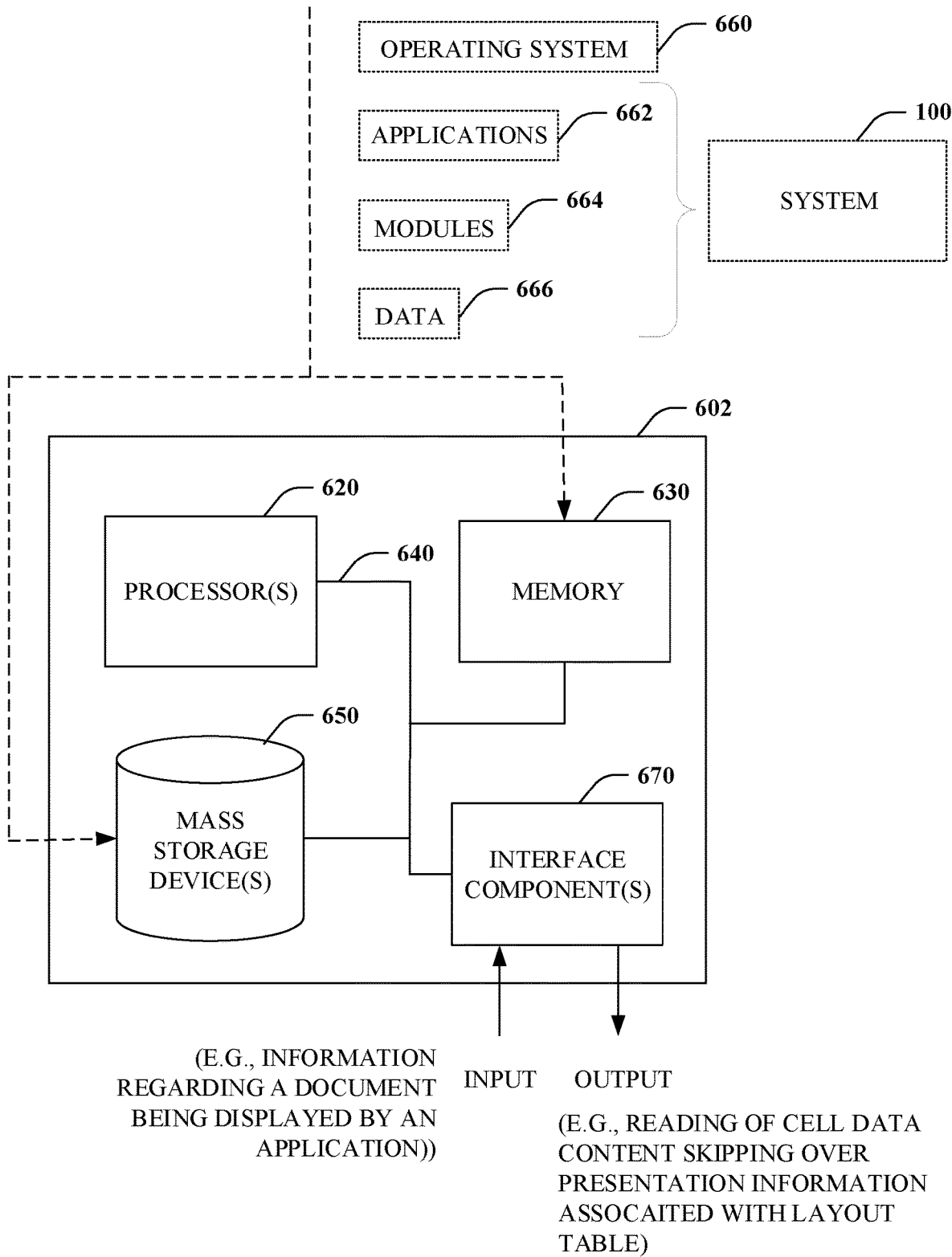
FIG. 6 is a functional block diagram that illustrates an exemplary computing system.

With reference to FIG. 6, illustrated is an example general-purpose processing system, computer or computing device 602 (e.g., mobile phone, desktop, laptop, tablet, watch, server, hand-held, programmable consumer or industrial electronics, set-top box, game system, compute node, etc.). For instance, the computing device 602 may be used in a system for detecting layout table(s) 100.

The computer 602 includes one or more processor(s) 620, memory 630, system bus 640, mass storage device(s) 650, and one or more interface components 670. The system bus 640 communicatively couples at least the above system constituents. However, it is to be appreciated that in its simplest form the computer 602 can include one or more processors 620 coupled to memory 630 that execute various computer executable actions, instructions, and or components stored in memory 630. The instructions may be, for instance, instructions for implementing functionality described as being carried out by one or more components discussed above or instructions for implementing one or more of the methods described above.

The processor(s) 620 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 620 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 620 can be a graphics processor.

The computer 602 can include or otherwise interact with a variety of computer-readable media to facilitate control of the computer 602 to implement one or more aspects of the claimed subject matter. The computer-readable media can be any available media that can be accessed by the computer 602 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 602. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 630 and mass storage device(s) 650 are examples of computer-readable storage media. Depending on the exact configuration and type of computing device, memory 630 may be volatile (e.g., RAM), non-volatile (e.g., ROM, flash memory, etc.) or some combination of the two. By way of example, the basic input/output system (BIOS), including basic routines to transfer information between elements within the computer 602, such as during start-up, can be stored in nonvolatile memory, while volatile memory can act as external cache memory to facilitate processing by the processor(s) 620, among other things.

Mass storage device(s) 650 includes removable/non-removable, volatile/non-volatile computer storage media for storage of large amounts of data relative to the memory 630. For example, mass storage device(s) 650 includes, but is not limited to, one or more devices such as a magnetic or optical disk drive, floppy disk drive, flash memory, solid-state drive, or memory stick.

Memory 630 and mass storage device(s) 650 can include, or have stored therein, operating system 660, one or more applications 662, one or more program modules 664, and data 666. The operating system 660 acts to control and allocate resources of the computer 602. Applications 662 include one or both of system and application software and can exploit management of resources by the operating system 660 through program modules 664 and data 666 stored in memory 630 and/or mass storage device (s) 650 to perform one or more actions. Accordingly, applications 662 can turn a general-purpose computer 602 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 662, and include one or more modules 664 and data 666 stored in memory and/or mass storage device(s) 650 whose functionality can be realized when executed by one or more processor(s) 620.

In some embodiments, the processor(s) 620 can correspond to a system on a chip (SOC) or like architecture including, or in other words integrating, both hardware and software on a single integrated circuit substrate. Here, the processor(s) 620 can include one or more processors as well as memory at least similar to processor(s) 620 and memory 630, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 602 also includes one or more interface components 670 that are communicatively coupled to the system bus 640 and facilitate interaction with the computer 602. By way of example, the interface component 670 can be a port (e.g. serial, parallel, PCMCIA, USB, FireWire, etc.) or an interface card (e.g., sound, video, etc.) or the like. In one example implementation, the interface component 670 can be embodied as a user input/output interface to enable a user to enter commands and information into the computer 602, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 670 can be embodied as an output peripheral interface to supply output to displays (e.g., LCD, LED, plasma, etc.), speakers, printers, and/or other computers, among other things. Still further yet, the interface component 670 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:
   a processor; and
   a memory having computer-executable instructions stored thereupon which, when executed by the processor, cause the system to:
   receive multiple attributes of a particular table provided in a document displayable by an application;
   calculate a table score for the particular table by applying different weights to at least two different attributes of the particular table;
   classify the particular table as a data table or a layout table based at least upon the calculated table score; and
   selectively control verbal readout of the particular table by a screen reader based at least on whether the particular table is classified as a data table or a layout table,
   wherein, when the particular table is classified as a layout table, the screen reader is controlled to skip over metadata associated with the particular table and initiate verbal readout of the particular table starting with data content within the particular table.

2. The system of claim 1, wherein the multiple attributes are received from an application programming interface of a user interface automation system that provides access to user interface elements of the application.

3. The system of claim 1, wherein the computer-executable instructions, when executed by the processor, cause the system to:
   compare the table score to a threshold and classify the particular table based at least on whether the table score exceeds the threshold.

4. The system of claim 3, wherein the at least two different attributes include two or more of a table name, a row header, a column header, an editable cell, a caption, a visual border, or a spreadsheet pattern.

5. The system of claim 3, wherein the at least two different attributes include two or more of a number of rows, a number of columns, cell information, bounding rectangle on table information, bounding rectangle on cells information, or nested table information.

6. The system of claim 1, wherein the metadata that is skipped over comprises at least one of table metadata or cell metadata.

7. The system of claim 1, wherein the particular table is classified according to a rule-based heuristic determined by applying the different weights to the at least two different attributes of the particular table.

8. The system of claim 1, wherein the computer-executable instructions, when executed by the processor, cause the system to:
   modify at least one of the different weights based upon at least one of a user action or user feedback regarding classification of the particular table as a data table or a layout table.

9. A method performed by a computing device, the method comprising:
   receiving multiple attributes of a particular table provided in a document displayable by an application;
   calculating a table score for the particular table by applying different weights to at least two different attributes of the particular table;
   classifying the particular table as a data table or a layout table based at least upon the calculated table score; and
   selectively controlling verbal readout of the particular table by a screen reader based at least on whether the particular table is classified as a data table or a layout table,
   wherein, when the particular table is classified as a layout table, the screen reader is controlled to skip over metadata associated with the particular table and initiate verbal readout of the particular table starting with data content within one or more cells of the particular table.

10. The method of claim 9, wherein the multiple attributes are received from an application programming interface of a user interface automation system that provides access to user interface elements of the application.

11. The method of claim 9, further comprising:
    when the particular table is classified as a layout table, controlling the screen reader to skip over at least one table navigation command when performing the verbal readout of the particular table.

12. The method of claim 11, wherein the at least two different attributes include three or more of a table name, a row header, a column header, an editable cell, a caption, a visual border, or a spreadsheet pattern.

13. The method of claim 11, wherein the at least two different attributes include three or more of a number of columns, cell information, bounding rectangle on table information, bounding rectangle on cells information, or nested table information.

14. The method of claim 9, wherein the metadata that is skipped comprises table metadata and cell metadata.

15. A computer storage media storing computer-readable instructions that, when executed, cause a computing device to:
    receive multiple attributes of a particular table provided in a document displayable by an application;
    calculate a table score for the particular table by applying different weights to at least two different attributes of the particular table;
    classify the particular table as a data table or a layout table based at least upon the calculated table score; and
    selectively control verbal readout of the particular table by a screen reader based at least on whether the particular table is classified as a data table or a layout table,
    wherein, when the particular table is classified as a layout table, the screen reader is controlled to skip over at least some metadata associated with the particular table when performing the verbal readout of the particular table.

16. The computer storage media of claim 15, wherein the at least two different attributes are selected from a first set of attributes indicative of data tables and a second set of attributes indicative of layout tables.

17. The computer storage media of claim 16, wherein the first set of attributes includes a table name attribute and a column header attribute.

18. The computer storage media of claim 17, wherein the table name attribute has a relatively greater weight than the column header attribute.

19. The computer storage media of claim 17, wherein the second set of attributes includes a lack of visual borders attribute and a lack of column headers attribute.

20. The computer storage media of claim 19, wherein the lack of visual borders attribute has a relatively greater weight than the lack of column headers attribute.

* * * * *